United States Patent Office 3,234,150

Patented Feb. 8, 1966

3,234,150

STRONG BASE ANION EXCHANGE RESINS FROM POLYMERIC TERTIARY AMINES

Charles A. Feldt, Naperville, and George T. Kekish, Chicago, Ill., assignors to Nalco Chemical Company, Chicago, Ill., a corporation of Delaware No Drawing. Filed June 16, 1960, Ser. No. 36,492

13 Claims. (Cl. 260—2.1)

The present invention relates to new high capacity strong base anion exchange resins. Particularly, the invention is directed to strong base anion exchange resins which have improved ion absorption and ion exchange properties. The invention further relates to the method of preparing these new resins as well as to their use in the removal of electrolytes from various types of aqueous and non-aqueous liquids.

Ion exchange materials are well known in the art. Such materials have the ability to exchange ions between a solid and liquid without substantially altering the physical structure of the solid. Ion exchange resins have been used extensively for removing electrolytes from water in such operations as desalting, demineralization and deionization. Ion exchange processes are also used in the pharmaceutical, food processing, electroplating and petroleum and waste treatment industries, as well as in the field of medicine for removal of undesired components of liquids and for other purposes.

Anion exchange resins, in order to be satisfactory commercially, must be substantially insoluble in water. They must be resistant to physical deterioration such as swelling or shattering. They should have a high porosity and a high operating capacity. It has been noted that resins which are highly porous and have a high capacity also tend to be soft and susceptible to swelling when changing from the regenerated to the exhausted form. The percent swelling depends on a variety of factors such as crosslinking, operating capacity, and the method of preparing the resin. Softness is coupled with a tendency to crumbling. High swelling leads to various engineering problems with respect to the design of the equipment used to provide contact of fluids with the resin in commercial system. A hard, highly crosslinked resin, which is resistant to swelling and crumbling, correspondingly tends to lack porosity and consequently has a relatively low operating capacity.

Up to the present time numerous strong base anion exchange resins have been available from several sources of supply. These commercial resins have as their functional groups or exchange sites quaternary ammonium groupings. Depending upon the particular type of quaternary ammonium grouping present in the resin's structure they show some difference in their affinities towards chloride and hydroxide ions. It has been observed that as the quaternary ammonium grouping becomes more efficient in its ability to be converted to the hydroxide form, its chemical and physical stabilities are proportionally diminished. Conversely, chemically and physically stable quaternary ammonium strong base resins having less affinity for hydroxide over chloride ions evidence somewhat lower capacity characteristics.

Strong base anion exchange resins are attractive from an operational standpoint since they are highly ionized and may be used over broad pH ranges. One of the most important operational characteristics of strong base anion exchange resins is that they are capable of performing "salt splitting" reactions. The expression, "salt splitting" refers to the ability of anion exchange resins to convert ionized salts to their corresponding bases when the resin is used in its free base form.

The most common types of strong base anion exchange resins are those prepared from a resin backbone which is synthesized by the copolymerization reaction of a monovinyl aryl compound with a divinyl aryl compound. These starting copolymers are then haloalkylated with an alkylating agent such as chloromethyl ether. They are then reacted with a tertiary amine to produce quaternary ammonium groups. To produce the finished resin, it is necessary to prepare the backbone of the resin by conducting a suspension polymerization and then through a subsequent series of steps, haloalkylating the resin and finally reacting it with an amine or amines of the type described. Such a procedure is obviously time consuming and expensive.

Experience with resins of the type above described has shown that when they undergo chemical degradation losses occur in total basic capacity. That is to say that the degradation occurs at or near the aromatic nuclei of the resin backbone thereby causing a sloughing off or loss of the basic nitrogen containing portion of the molecule. One might speculate that the attack on the nitrogen group attached to the resin backbone occurs in the following sequential way:

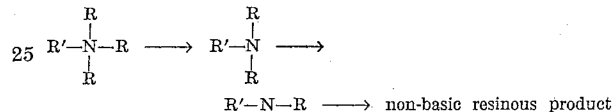

It can be clearly seen then that the loss of exchange capacity occurs in a series of chemical degradative steps with the final step being a complete loss of nitrogen to the fluid media being exchanged. This results in a resin with little or no exchange capacity. Indications of direct attack on the polymer lattice are not noticeable. If it were possible to produce a strong base anion exchange resin which under conditions of chemical degradation could retain a portion of the basic nitrogen groups intact, it would be possible to continue using such resins for longer periods of time. As long as a portion of the nitrogen moiety remains attached in some form to the polymeric backbone, exchange capacity will exist, the degree of which is dependent upon the number of aromatic groups which are nitrogen containing groups.

The strong base resins of the instant invention now make available many advantages and features not heretofore provided by prior art strong base anion exchange resins. In the first instance they have substantially higher capacities. Secondly, when subjected to oxidizing conditions they do not lose their entire basic capacity but undergo slower sequential degradation whereby the resins are gradually converted from strongly basic to weakly basic resins.

This is due to the fact that the nitrogen is part of the polymeric backbone itself since the condensation polymerization reaction proceeds through the nitrogen atom. A third advantage of the resins forming the subject matter of this invention is that they are more simply prepared and may be readily made into either granules or beads relatively uniform in size. Also the resins, as will be shown hereinafter, are prepared from dilute aqueous solutions which offers a simple route for their preparation. An important advantage of the inventions resides in the fact that the resins may be prepared so that their operating characteristics may be altered readily by using only minor variations in synthetic procedure. Not only do the resins of the invention give excellent stability for extended periods of time but they also possess operating capacities of a high order. The industrial practicality and performance is directly reflected by operating capacity data of ion exchange resins. An improvement in capacity is due directly to the increased availability of nitrogen per dry weight of resin.

In recent years a special problem has become evident in connection with the removal of anions from aqueous systems by strong base resins where such systems contain large polar organic molecules which have anionic or polar characteristics. Under such conditions strong base anion exchange resins tend to absorb these organic substances in such a fashion that their operating capacities are substantially diminished. These organic materials are not capable of being removed from the resins and in time will sufficiently deplete their capacity so that the resins must be discarded. This phenomenon of organic contamination of stronger base anion exchange resin is known as organic fouling. The resins of the instant invention have the important advantage of having greater resistance to organic fouling. This means that under fouling conditions these resins are capable of operating for longer periods of time without loss in operating capacity being experienced. It therefore becomes an object of the invention to provide anion exchange resins which are relatively immune to organic fouling.

Another object of the invention is to provide strong base anion exchange resins which have extremely high operating capacities.

A further object is to provide strong base anion exchange resins which are readily prepared using simple synthesis techniques.

Still another object of the invention is to provide strong base anion exchange resins which may be readily modified to work efficiently under various typical operating conditions by the expediency of utilizing simple variations in the synthesis steps used to prepare these resins.

A still further object is to provide new type strong base anion exchange resins which under conditions of chemical degradation will not completely lose their capacity. Other objects will appear hereinafter.

In accordance with the invention it has been found that superior strong base anion exchange resins may be prepared by reacting certain water soluble polymeric amines with glycerol halohydrins under such conditions that a water insoluble resinous condensate is produced.

The water soluble polymeric amines used in forming the resins may be selected from two generic categories of water soluble polymeric amines. The first category comprises water soluble polymeric amines which are heterocyclic and contain substantially all tertiary amino groups. This type of polymeric amine is exemplified by the well known polymers formed by the addition polymerization of vinyl imidazoles. Thus the homo and copolymers of such imidazoles as N-vinyl-4,5-benzimidazole, N-vinyl-2-hydroxyethyl imidazole, N-vinyl-2-methyl imidazole, N-vinyl-2-phenyl imidazole and N-vinyl imidazole are admirably suited for use as starting polymers in preparing the resins. The most preferred vinyl imidazole polymer is poly-N-vinyl imidazole. These polymers are soluble in water and may be prepared so that the molecular weights may be varied from as little as several thousand to about 40,000 or more.

It has also been found that poly-(2 or 4)-vinyl pyridine may be effectively employed as a starting material in the reaction.

The second type of water soluble polymeric amine that may be used in preparing the resins of the invention are linear polymeric tertiary amines. Polymeric amines of this type may be illustrated by such amines as the condensation polymers formed by the homo or copolymerization of the N-lower alkyl alkylene imines. The starting imine monomer used to prepare polymers of this type may be represented by the following structural formula:

(A)

```
    R     R
    |     |
R—C———C—R
     \   /
      N
      |
      R'
```

In the above formula R is a member of the class consisting of hydrogen and lower aliphatic hydrocarbon groups of not more than three carbon atoms in chain length. R' is a lower aliphatic hydrocarbon group of not more than three carbon atoms in chain length. Typical starting ethylene imines used in preparing the water soluble polymers are such compounds as N-methyl ethylene imine, N-ethyl ethylene imine, N-methyl-1,2-propylene imine, N-ethyl-1,2-butylene imine, N-methyl-2,2-dimethyl ethylene imine and N-propyl ethylene imine.

Other useful alkylene imines that may be used in preparing starting polymers not covered by the structural formula, are the N-lower alkyl substituted 1,3-propylene imines which are illustrated by the compounds N-methyl-1,3-propylene imine and N-ethyl-1,3-propylene imine. The preferred polymers prepared from the above described monomers are N-methylpolyethylene imine and N-ethylpolyethylene imine. The molecular weights of these polymers may be varied, with the most suitable being those polymers having molecular weights of at least 5,000 with polymers having molecular weights in excess of 25,000 being preferred.

Other types of linear polymeric tertiary amines are those represented by the following structural formulas:

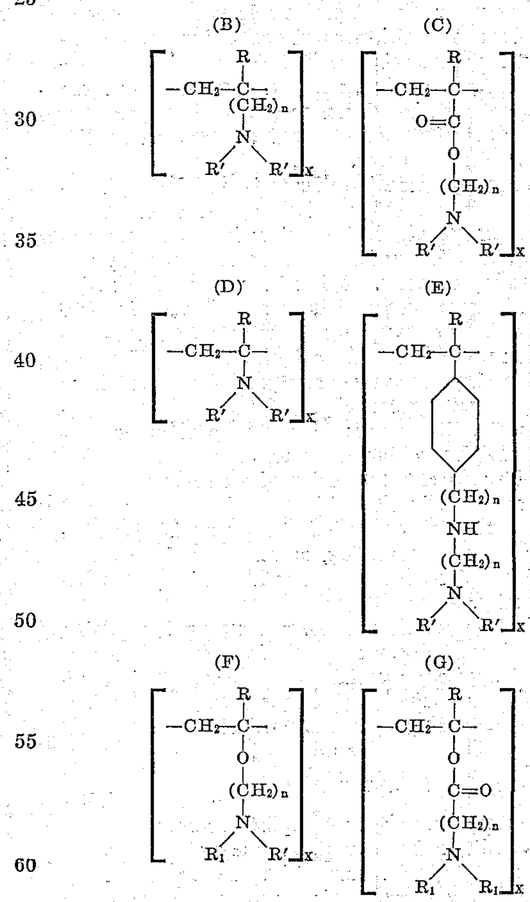

In structural Formulas B–G above, $n$ is a small whole number having a value of between 1–4, $x$ is an integer and R is a member of the class consisting of hydrogen and lower acyclic aliphatic hydrocarbon radicals of from 1 to 4 carbon atoms in chain length. R' has the same significance as shown in structural Formula A.

All of the polymers shown in structural Formulas B–F have the basic nitrogen atom as a member of a branch chain group attached to a linear aliphatic hydrocarbon chain. An inspection of these formulas also reveals that the basic N atom is either (1) directly attached to the hydrocarbon polymer chain (D), (2) connected to the hydrocarbon polymer chain through one or more carbon atoms (B), (3) connected to the hydrocarbon polymer chain through an aromatic grouping (E), (4) connected to the hydrocarbon polymer chain through oxygen atom (F), or (5) connected to the hydrocarbon polymer chain through a carboxylic ester group (C and G).

All of the polymers described above are prepared by using addition polymerization techniques in some stage of their preparation. Polymers of type B may be synthesized by hydrogenating a suitable ethylenically unsaturated nitrile e.g. poly-acrylonitrile, and then reacting the hydrogenated polymer with lower hydrocarbon alkylating agents such as ethyl chloride or dimethyl sulfate.

Type C polymers are prepared by esterifying the copolymer of maleic anhydride and another reactive vinyl monomer, e.g. acrylonitrile, styrene, and the like with for instance a hydroxy amine as N,N-diethyl ethanol amine.

Polymers of type D are the well known polyvinyl amines illustrated by polyvinyl N,N-dimethyl amine. Polymers of the D and B type are not easily prepared nor are they commercially available. Hence they are not too desirable from a practical standpoint for use as starting reactants.

Polymer type E is readily prepared by alkylating linear polystyrene with chloromethyl ether and then aminating with a polyamine such as N,N-dimethyl ethylene diamine.

Polymers F and G are derivatives of polyvinyl alcohol and are prepared by making amino ethers or amino esters of this polyol. Polymer G may be illustrated by the readily available polymer, poly-N,N-dimethyl amino ethyl methacrylate. As will be shown later, polymers of this type are admirably suited for making the resins of the invention.

The glycerol halohydrins used to react with the polymeric polyamines may be selected from any of the well known materials of this class. In a preferred practice of the invention it is preferred to use the epihalohydrins e.g. epichlorohydrin, epibromohydrin or epiiodohydrin. It will be understood, however, that the other glycerol halohydrins such as glycerol chlorohydrin may be used with satisfactory resins being produced in all instances. The most preferred epihalohydrin from the standpoint of cost, commercial availability and superior performance rendered by its use is epichlorodydrin.

The amount of glycerol halohydrin used in relation to the water soluble polymeric amine should be controlled so as to produce a molar ratio of glycerol halohydrin to water soluble polymer of at least 1:2. It is preferred to use larger quantities of glycerol halohydrin to polymeric amine with a preferred ratio being at from about 1:1 to 5:1. Excellent results are produced when the molar ratio is maintained at about 1:1.

In one embodiment of the invention the resins are prepared by utilizing aqueous solutions of the polymeric amine. To these solutions are then added the glycerol halohydrin. The concentration of the polymeric amine solution may be varied over a relatively wide range of solution strengths. As a general rule from about 5 to 25% by weight solution may be used with from about 10 to 15% solution being preferred. The concentrations of the starting solution will be primarily dependent upon the viscosity. The reactions are more readily conducted when the viscosity of the polymer solutions is at about 700 cps. To make the resins, the glycerol halohydrin is added with stirring to the solution of the polymeric amine. The rate of addition should be sufficient to prevent high local zones of concentration of the two reactants from occurring. Experience has shown that the addition rate of the glycerol halohydrin to the solution of polymeric amine may be maintained within the ranges of from 5 to 60 minutes of dropwise addition.

Many of the polymeric amines will react with the glycerol halohydrin exothermically, whereas in other cases the reaction must be heated somewhat to cause the reaction to begin. It is desirable that the temperature of the reaction be maintained within the ranges of 25 to 150° C. In no case should the temperature exceed 175° C.

The reaction described above evidences completion when a gel-like structure or condition occurs in the reaction vessel. At this point the gelled mass may be removed from the reactor and then dried at room temperature or above, with the drying temperatures being capable of variation between 60 and 90° C. for from 5 to 10 hours. After the drying operation the dried gel may then be ground into suitable size granules at which point it is then ready for use in removing electrolytes from various types of systems.

It has been further discovered that the reaction described above may be controlled so as to produce the resin particles in the form of beads. This is accomplished by reacting the water soluble polymeric amine and the glycerol halodydrin so as to conduct a suspended polymerization reaction. This suspension polymerization reaction is conducted in the presence of water and an organic azeotrope forming liquid such as benzene, toluene, xylene, and the like.

To conduct the suspension polymerization, an aqueous solution of the polymeric amine is used as a starting material with the concentration thereof being within the limits previously prescribed. The aqueous solution of the polymeric amine is added to the glycerol halohydrin which has been suspended in the azeotrope forming liquid. The quantity of azeotrope liquid is most preferably maintained at between 1 to 5 times the volume of the total volume of the polymer solution. Upon addition of the polymer solution to the azeotrope forming liquid which contains the glycerol halohydrin agitation is applied. The amount of agitation controls the size of the beads formed during the reaction. The bead size may be further controlled by the viscosity of the suspension. The finished beads should have an overall particle size within the range of 10 to 50 mesh. To achieve this particle size range, the viscosity of the suspension should be at about 500 cps. with the speed of the stirrer being at about 110 to 130 r.p.m. After the reactants are blended, the reaction mixture is elevated to a temperature range between 50 to 140° C. with these temperatures being sufficient to insure reflux conditions. The refluxing not only removes water and azeotrope forming liquid from the reaction system but it also causes the reaction to go to completion. This refluxing reaction should be conducted for a period of time ranging from between 3 to 5 hours.

To insure uniformity of the suspension during the bead forming reaction it is desirable to employ a suitable suspending agent such as an ethoxylated fatty acid amide, e.g. oleic acid amide which has been reacted with 5 moles of ethylene oxide.

To illustrate the practices of the invention the following are given by way of examples.

EXAMPLE I

This examination illustrates the preparation of a strong base anion exchange resin in granular form. Into a 500-milliliter reaction flask equipped with a thermometer and stirrer was placed 30 g. of poly-N-vinyl imidazole and 90 ml. of water. This gives a starting polymer solution concentration of 25% by weight. After the water and polyvinyl imidazole solution were uniformly dissolved, 29.5 g. of epichlorohydrin was added at room temperature. A slightly exothermic reaction resulted. After the addition, heat was applied until the temperature reached 45° C. at which time gelling occurred, approximately 5 minutes after the addition of the epichlorohydrin. The temperature was gradually elevated so that after the end of 20 minutes, the temperature reached 86° C. The mixture was cooled over a period of 2 hours to room temperature. The resultant gel produced was washed with water, filtered, and rewashed. The material was then ground to a particle size of 10–50 mesh and dried in a vacuum oven for one day at a temperature of 90° C.

EXAMPLE II

This example illustrates the preparation of beads from poly-N-vinyl imidazole and epichlorohydrin. Into a 3-necked, 1-liter reaction flask equipped with a stirrer, condenser, thermometer, and a Dean and Stark trap, was placed 450 ml. of toluene, 4.5 g. ethoxylated fatty acid amide and 39.5 g. of epichlorohydrin. To this toluene-epichlorohydrin mixture was added 127 g. of a 15% solution of polyvinyl imidazole at room temperature. The temperature was then elevated to 85° C. at which time an azeotropic mixture of water and toluene distilled off. Water was collected and removed during the course of the reaction when necessary, from the Dean and Stark trap. The total heating time for the reaction was 4 hours. When the reaction was completed, the flask temperature was 110° C. The reaction mixture was cooled at 40° C. The beads which had been formed were filtered on a Buchner funnel and air dried at room temperature for 24 hours. The beads which were subsequently tested had a particle size of 10–50 mesh.

After 3 hours of heating, the temperature reached 86° C. and an azeotropic mixture of water and toluene began to distill off. After 3½ hours of reflux with periodic withdrawing of water from the Dean and Stark trap, the resultant gel produced was filtered on a Buchner funnel and washed twice. Washing had the added effect of disintegrating the large granular lumps into small workable pieces. The resinous granules were air dried for one day at room temperature.

EXAMPLE V

The reaction of Example II was repeated to show the reproducibility of the invention. The preceding examples inherently illustrate the fact that the solid products obtained are insoluble in both water and organic solvents after the reaction is complete, since beads or granules are obtained from a system containing both types of solvents.

The resins prepared in the foregoing examples were subjected to various conventional tests in order to determine their performance characteristics. Also tested in the same manner for comparative purposes, were beads of a commercially available resin which is in common use.

*Table I*

| Composition | Water Holding Capacity | TC [1], meq./g. | TC, meq./ml. | Column Test Operating Capacity [3], Kgr./cu. ft. | SSC [2], meq./g. | SSC, meq./ml. | Percent Expansion (from Cl⁻ form to OH⁻ form) |
|---|---|---|---|---|---|---|---|
| Example I | 69.0 | 5.05 | 0.97 | 8.1 | 3.48 | 0.67 | +6.6 |
| Example II | 52.4 | 4.98 | 1.86 | 22.0 | 4.36 | 1.63 | +21.1 |
| Example III | 60.8 | 6.40 | 2.13 | 17.8 | 3.94 | 1.31 | ---------- |
| Example IV | 73.4 | 9.50 | 1.18 | Trace | 0.24 | Trace | ---------- |
| Example V | 57.2 | 4.85 | 1.58 | 20.6 | 4.27 | 1.39 | +27.0 |
| Typical Commercially Available Strong Base Resin | 43.1 | 3.36 | 1.38 | 10.4 | 3.34 | 1.37 | +21.7 |

[1] Total Capacity.
[2] Salt Splitting Capacity.
[3] Operating salt splitting capacity based on 5 pound NaOH regeneration per cubic foot resin.

EXAMPLE III

This example illustrates the preparation of beads from N-methyl polyethylene imine and epichlorohydrin. To a 1-liter 3-necked flask was added 450 ml. toluene, 4.5 g. of ethyoxylated fatty acid amide and 58 g. of epichlorohydrin. The flask had been fitted with a thermometer, stirrer, reflux condenser and Dean and Stark trap. After mixing the contents of the flask thoroughly, there was added at room temperature, 141.5 g. of a 25.2% solution of N-methyl polyethylene imine which had been prepared by the alkylation of polyethylene imine with methyl iodide with the polymeric free base form being prepared from the reaction mixture by passage through a strong base resin (hydroxide form). After addition of the N-methyl polyethylene imine, the entire contents of the flask were heated. After 15 minutes of heating, an azeotropic mixture of toluene and water began to distill. During the course of the reaction water was periodically removed when necessary from the Dean and Stark trap. The stirrer was adjusted to approximately 120 r.p.m. After a total reflux time of 3½ hours, the flask was cooled to room temperature and the resultant beads were filtered in a Buchner funnel and then air-dried at room temperature for 48 hours. Small, uniform beads were obtained which were ready for subsequent testing without further screening.

EXAMPLE IV

This example illustrates the preparation of a granular strong base anion exchange resin obtained from the condensation of poly-N-vinyl imidazole and ethylene dichloride. To a 1-liter, 3-necked flask equipped with stirrer, thermometer, reflux condenser, and Dean and Stark trap was added 450 ml. of toluene, 4.5 g. of ethyoxylated fatty acid amide and 42 g. of ethylene dichloride. This this was added at 29° C., 122 g. of a 15% poly-N-vinyl imidazole aqueous solution. The entire mixture was stirred for five minutes and then heated.

Table I shows the improved operating capacities afforded by the resins of the invention over typical prior art materials. Table I further illustrates that the resins produced by using an alkylating agent other than a glycerol halohydrin were substantially inferior from the standpoint of both capacity and physical and chemical characteristics. It is believed that the glycerol halohydrins, particularly the epihalohydrins, tend to produce a branched chain and/or possibly crosslinked structure which has extreme strength coupled with surprisingly excellent ion exchange capacity. These phenomena might possibly be ascribed to the fact that any crosslinking that occurs does so through the tertiary amino groups.

Oxidation studies have shown that under severe oxidizing conditions the resins, when they begin to degrade, apparently do so by the loss of an alkyl group without destroying the basicity of the molecule. Expressed in another fashion, the resins under strong oxidizing conditions tend to degrade from a quaternary ammonium type resin to tertiary or secondary amines forming weak base type anion exchange resins. This important feature of the invention allows the resins to be used under relatively strong oxidizing conditions and when their salt splitting capacity has substantially diminished, they may be converted to weak base resins.

Another important observation that may be drawn from Table I is the large water holding capacities of the resins which are an indication of their extreme porosity which allows them to be successfully used in systems where organic fouling is a problem. Further, the resins, even though having a large water holding capacity are attrition resistant and are mechanically strong to a surprising degree. Of particular interest is the vastly improved performance gained by the use of the bead technique in the formation of the resin. A comparison of Example I with either Example II or V shows that the operating capacity of the latter two is a two to three fold increase over the former. A like showing is made by a comparison of the resin from Example II or V with a typical industrial strong base anion resin.

The invention is hereby claimed as follows:

1. A high capacity strong base anion exchange resin which comprises a solvent insoluble resinous particulate condensate of bead shape formed by reacting as sole starting materials an epihalohydrin with a water soluble homopolymeric amine from the group consisting of heterocyclic polymeric tertiary amines and linear polymeric tertiary amines, with the molar ratio of glycerol halohydrin to water soluble polymeric amine being at least 1:2.

2. The high capacity strong base resin of claim 1 where the water soluble homopolymeric amine is a water soluble polymer of a vinyl imidazole.

3. The high capacity strong base resin of claim 2 where the water soluble polymer of a vinyl imidazole is poly-N-vinyl imidazole.

4. The high capacity strong base resin of claim 1 where the water soluble homopolymeric amine is a water soluble polymer of N-lower alkyl substituted alkylene imine.

5. The high capacity strong base resin of claim 3 where the water soluble polymer of an N-lower alkyl substituted alkylene imine is N-methyl polyethylene imine.

6. The high capacity strong base resin of claim 1 where the molar ratio of epihalohydrin to water soluble homopolymeric amine is within the range of from 1:1 to 5:1.

7. A high capacity strong base anion exchange resin which comprises a solvent insoluble resinous particulate condensate of bead shape formed by reacting as sole starting materials epichlorohydrin with the homopolymer of poly-N-vinyl imidazole with the molar ratio of epichlorohydrin to poly-N-vinyl imidazole being within the range of from 1:1 to 5:1.

8. A high capacity strong base anion exchange resin which comprises a solvent insoluble resinous particulate condensate of bead shape formed by reacting as sole starting materials epichlorohydrin with the homopolymer of N-methyl polyethylene imine with the molar ratio of epichlorohydrin to N-methyl polyethylene imine being within the range of 1:1 to 5:1.

9. The method of treating liquids to remove dissolved electrolytes which comprises contacting said liquids with particles of a high capacity strong base anion exchange resin, said resin comprising a solvent insoluble resinous condensate of bead shape formed by reacting as sole starting materials an epihalohydrin with a water soluble homopolymeric amine from the group consisting of heterocyclic polymeric tertiary amines and linear polymeric tertiary amines, with the molar ratio of glycerol halohydrin to water soluble polymeric amine being at least 1:2.

10. The method of treating liquids in accordance with claim 9 wherein the water soluble homopolymeric amine is a water soluble polymer of a vinyl imidazole.

11. The method of treating liquids in accordance with claim 9 wherein the water soluble homopolymeric amine is a water soluble polymer of an N-lower alkyl substituted alkylene imine.

12. The method of treating liquids to remove dissolved electrolytes which comprises contacting said liquids with particles of a high capacity strong base anion exchange resin, said resin comprising a solvent insoluble resinous condensate of bead shape formed by reacting as sole starting materials epichlorohydrin with the homopolymer of poly-N-vinyl imidazole with the molar ratio of epichlorohydrin to polyvinyl imidazole being within the range of 1:1 to 5:1.

13. The method of treating liquids to remove dissolved electrolytes which comprises contacting said liquids with particles of a high capacity strong base anion exchange resin, said resin comprising a solvent insoluble resinous condensate of bead shape formed by reacting as sole starting materials epichlorohydrin with the homopolymer of N-methyl polyethylene imine with the molar ratio of epichlorohydrin to N-methyl polyethylene imine being within the range of from 1:1 to 5:1.

References Cited by the Examiner

UNITED STATES PATENTS

| | | | |
|---|---|---|---|
| 2,272,489 | 2/1942 | Ulrich | 260—2 |
| 2,296,225 | 9/1942 | Ulrich | 260—2 |
| 2,759,946 | 8/1956 | Cislak et al. | 260—88.3 |
| 2,898,309 | 8/1959 | Greer | 260—2.1 |
| 2,898,310 | 8/1959 | Greer | 260—2.1 |
| 3,047,516 | 7/1962 | Feldt | 260—2.1 |
| 3,092,617 | 6/1963 | Feldt | 260—2.1 |

FOREIGN PATENTS

| | | |
|---|---|---|
| 634,943 | 3/1950 | Great Britain. |

OTHER REFERENCES

Gregor et al.: Die Makromolekulare Chemie, vol. 31, pp. 192–196, June 1959.

Manecke et al.: Zeitschrift für Elektrochemie, vol. 55, pp. 475–481 (1951).

Shepherd et al.: Chemical Society Journal (London), January 1957, pp. 86–92.

WILLIAM H. SHORT, *Primary Examiner.*

H. N. BURSTEIN, *Examiner.*